United States Patent
Takamizawa (10) Patent No.: US 10,018,518 B2
(45) Date of Patent: Jul. 10, 2018

(54) OVERHEAT DETECTION DEVICE FOR ELECTRIC MOTOR EQUIPPED WITH MULTIPLE PTC THERMISTORS

(71) Applicant: FANUC CORPORATION, Yamanashi (JP)

(72) Inventor: Suguru Takamizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 356 days.

(21) Appl. No.: 14/731,567

(22) Filed: Jun. 5, 2015

(65) Prior Publication Data

US 2015/0364976 A1 Dec. 17, 2015

(30) Foreign Application Priority Data

Jun. 13, 2014 (JP) ................. 2014-122609

(51) Int. Cl.
| | |
|---|---|
| *G01K 13/00* | (2006.01) |
| *H02K 11/25* | (2016.01) |
| *G01K 1/02* | (2006.01) |
| *G01K 3/00* | (2006.01) |
| *G01K 7/24* | (2006.01) |

(52) U.S. Cl.
CPC ............. *G01K 13/00* (2013.01); *G01K 1/026* (2013.01); *G01K 3/005* (2013.01); *G01K 7/24* (2013.01); *H02K 11/25* (2016.01)

(58) Field of Classification Search
CPC .. G01K 7/22; G01K 7/01; G01K 1/00; G01K 13/00; B60K 7/0007
USPC .............. 374/183, 185, 141, 152, 153, 57, 6
See application file for complete search history.

(56) References Cited

U.S. PATENT DOCUMENTS

| | | | | |
|---|---|---|---|---|
| 3,636,426 | A * | 1/1972 | Buiting | H02H 7/0852 318/471 |
| 5,380,704 | A | 1/1995 | Tarutani et al. | |
| 6,297,573 | B1 * | 10/2001 | Roth-Stielow | H02H 7/0833 310/68 C |
| 6,380,704 | B1 | 4/2002 | Chin | |

(Continued)

FOREIGN PATENT DOCUMENTS

| | | | |
|---|---|---|---|
| CN | 2711984 Y | * | 7/2005 |
| CN | 2716847 Y | * | 8/2005 |

(Continued)

OTHER PUBLICATIONS

Untranslated Notification of Reasons for Refusal mailed by Japan Patent Office (JPO) for Application No. JP 2014-122609, dated Nov. 29, 2016, 2 pages.

(Continued)

*Primary Examiner* — Gail Kaplan Verbitsky
(74) *Attorney, Agent, or Firm* — Fredrickson & Byron, P.A.

(57) ABSTRACT

The overheat detection device for an electric motor of the present invention includes: PTC thermistors each attached to the coil of a different phase of a three-phase AC electric motor and connected in series; an overheat determination unit for determining overheat of coils based on the output voltage from the serially connected circuit of the PTC thermistors; and, an output voltage control unit that controls the output voltage from the PTC thermistors in accordance with the electric angle or magnetic phase of the three-phase AC electric motor.

3 Claims, 12 Drawing Sheets

(56) References Cited

U.S. PATENT DOCUMENTS

| | | | |
|---|---|---|---|
| 7,102,314 B2* | 9/2006 | Hayashi | H02P 21/06 318/139 |
| 8,203,293 B2* | 6/2012 | Ohgushi | H02P 21/0003 318/400.02 |
| 8,704,466 B2* | 4/2014 | Maruyama | H02P 29/60 318/362 |
| 2002/0116100 A1* | 8/2002 | Shimazaki | B60L 11/1807 701/22 |
| 2005/0174090 A1* | 8/2005 | Hayashi | H02P 21/06 318/807 |
| 2006/0130504 A1* | 6/2006 | Agrawal | F25B 49/02 62/228.4 |
| 2006/0197394 A1* | 9/2006 | Applegate | F04D 25/066 310/156.08 |
| 2007/0019706 A1* | 1/2007 | Hudson | G01K 1/08 374/152 |
| 2007/0171055 A1* | 7/2007 | Laakso | G01K 7/24 340/545.2 |
| 2008/0170421 A1* | 7/2008 | Kishimoto | H02H 7/0844 363/55 |
| 2009/0189561 A1* | 7/2009 | Patel | H02H 7/0852 318/806 |
| 2009/0237020 A1* | 9/2009 | Sakai | H02P 27/08 318/400.11 |
| 2010/0065355 A1* | 3/2010 | Reddy | B60K 1/02 180/65.31 |
| 2011/0080126 A1* | 4/2011 | Yabuguchi | H02P 21/0003 318/400.21 |
| 2011/0316455 A1* | 12/2011 | Maruyama | H02P 29/60 318/373 |
| 2012/0293102 A1* | 11/2012 | Kock | B25J 9/126 318/473 |
| 2012/0326644 A1* | 12/2012 | Okumura | B62D 5/0487 318/400.21 |
| 2013/0271050 A1* | 10/2013 | Kirkpatrick | G01K 13/00 318/400.21 |
| 2014/0346999 A1* | 11/2014 | Ota | H02P 23/0095 318/798 |
| 2014/0361721 A1* | 12/2014 | Yamaguchi | H02P 29/0088 318/472 |
| 2015/0022133 A1* | 1/2015 | Sauer | H02P 29/02 318/473 |
| 2015/0364976 A1* | 12/2015 | Takamizawa | G01K 13/00 374/185 |
| 2016/0043671 A1* | 2/2016 | Kemp | H02P 21/0089 318/400.02 |
| 2016/0056622 A1* | 2/2016 | Hamilton | H02H 7/0852 318/472 |
| 2016/0181966 A1* | 6/2016 | Donolo | H02P 29/60 318/434 |
| 2016/0329853 A1* | 11/2016 | Koseki | H02P 27/06 |
| 2017/0184465 A1* | 6/2017 | Kanemoto | G01L 3/105 |
| 2017/0282720 A1* | 10/2017 | Sakano | B60L 3/0061 |

FOREIGN PATENT DOCUMENTS

| | | | |
|---|---|---|---|
| CN | 202586287 U | * | 12/2012 |
| CN | 205910321 U | * | 1/2017 |
| JP | 01136984 A | * | 5/1989 |
| JP | 10062266 A | * | 3/1998 |
| JP | 3214369 B2 | * | 10/2001 |
| JP | 2002315383 A | | 10/2002 |
| JP | 2007195343 A | * | 8/2007 |
| JP | 2008193774 A | * | 8/2008 |
| JP | 201049093 A | | 3/2010 |
| JP | 201210457 A | | 1/2012 |
| JP | 2013242110 A | * | 12/2013 |
| WO | 2014057533 A1 | | 4/2014 |

OTHER PUBLICATIONS

English machine translation of Notification of Reasons for Refusal mailed by JPO for Application No. JP 2014-122609, dated Nov. 29, 2016, 2 pages.

Untranslated Decision to Grant a Patent mailed by Japan Patent Office (JPO) for Application No. JP 2014-122609, dated Jan. 24, 2017, 3 pages.

English machine translation of Decision to Grant a Patent mailed by JPO for Application No. JP 2014-122609, dated Jan. 24, 2017, 3 pages.

English Abstract for Japanese Publication No. 2012-010457 A, published Jan. 12, 2012, 1 pg.

English Abstract for Japanese Publication No. 2010-049093 A, published Mar. 4, 2010, 1 pg.

English Abstract and Machine Translation for Japanese Publication No. 2002-315383 published Oct. 25, 2002, 52 pgs.

* cited by examiner

OVERHEAT DETECTION DEVICE FOR ELECTRIC MOTOR EQUIPPED WITH MULTIPLE PTC THERMISTORS

CROSS-REFERENCE TO RELATED APPLICATIONS

This application is a new U.S. patent application that claims benefit of JP 2014-122609, filed on Jun. 13, 2014, the entire content of JP 2014-122609 is hereby incorporated by reference.

FIELD OF THE INVENTION

The present invention relates to an overheat detection device for an electric motor, in particular relating to an overheat detection device for an electric motor equipped with a PTC thermistor for each phase of coils, in which the output voltage from each of the thermistors being connected in series can be detected.

BACKGROUND OF THE INVENTION

Conventional electric motors have been thermally protected by use of PTC (Positive Temperature Coefficient) thermistors, i.e., temperature-sensitive resistance elements having positive resistance-temperature characteristics or presenting approximately uniform resistance at normal temperature but exponentially increased resistance above a particular temperature (the Curie point temperature). Specifically, among the components of the electric motor, a PTC thermistor is arranged at a point or therearound where a noticeable amount of heat is generated. The amplitude of the output signal from the PTC thermistor is monitored so as to issue an overheat alarm when the output signal exceeds a prescribed level and thereby turn off magnetic excitation of the electric motor.

The PTC thermistor output signal is preferably sampled as an electric signal such as voltage. Therefore, in order to convert the resistance presented by the PTC thermistor into voltage, an electric circuit including an appropriate fixed resistance and the PTC thermistor is prepared so as to measure the divided voltage across the PTC thermistor by applying a fixed direct current (DC) voltage to the electric circuit. In this way, it is possible to sample the voltage corresponding to the resistance, hence determine whether or not overheat happens, using the voltage as a parameter.

Figure 1:
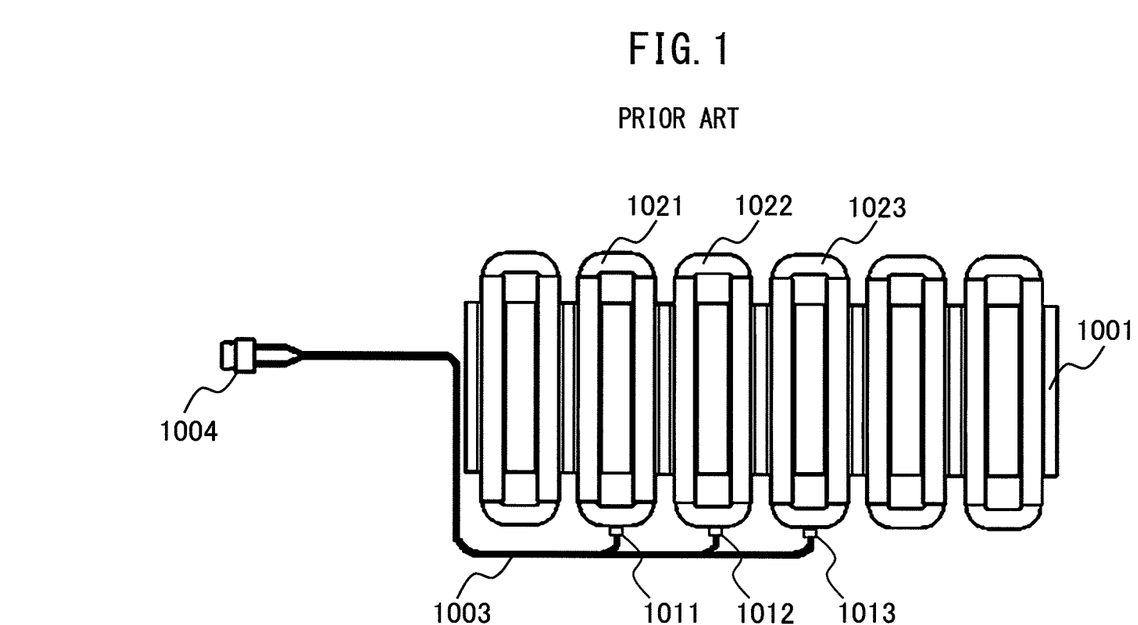
FIG. 1 is a diagram showing a conventional electric motor equipped with PTC thermistors.
Figure 2:
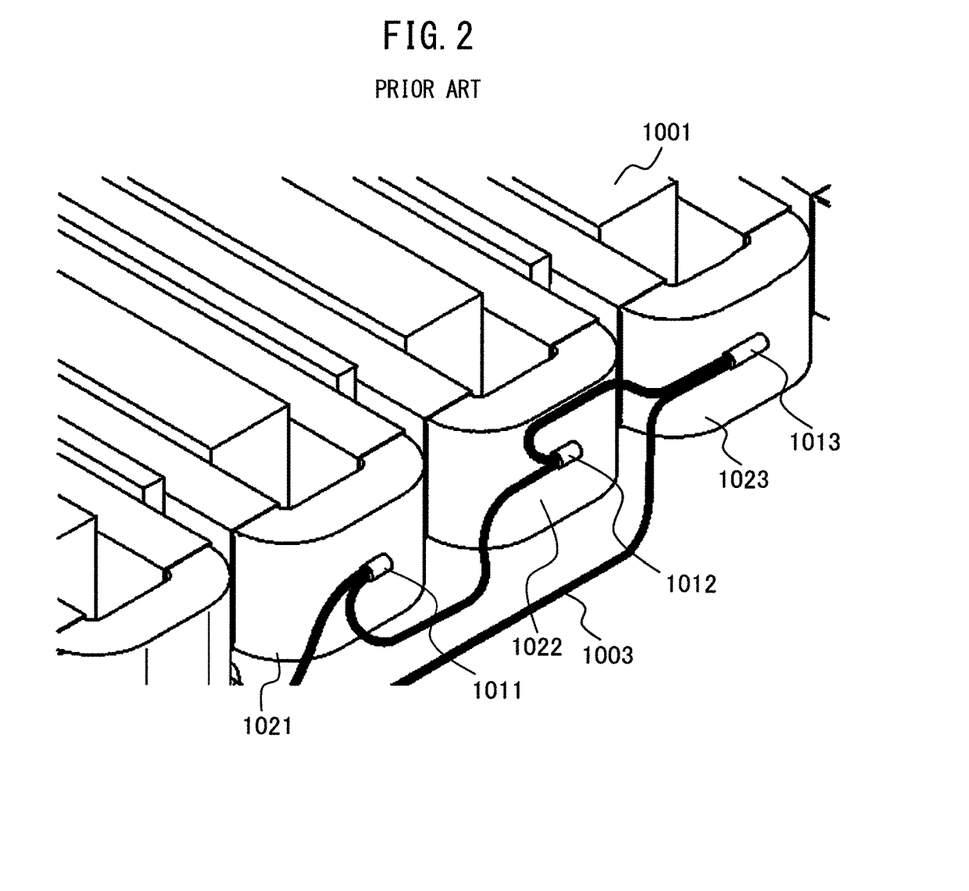
FIG. 2 is a diagram showing an example of a state of PTC thermistors attached inside a conventional electric motor equipped with PTC thermistors.

Particularly, in an electric motor including three-phase coils, a PTC thermistor is applied on the surface of the coil of each phase, and these thermistors are connected in series. This is because the PTC thermistors are connected with a single input and a single output so as to minimize the number of input/output terminals. FIG. 1 shows a conventional electric motor equipped with PTC thermistors. FIG. 2 shows a state of PTC thermistors mounted in the electric motor equipped with PTC thermistors. A core 1001 is provided with a U-phase coil 1021, V-phase coil 1022 and W-phase coil 1023, these three-phase coils having a U-phase PTC thermistor 1011, V-phase PTC thermistor 1012 and W-phase PTC thermistor 1013, respectively, on the surface thereof. These three PTC thermistors 1011 to 1013 are connected in series with a voltage-dividing resistor (not shown) having a fixed resistance by wire 1003, and applied with a prescribed voltage from a terminal 1004.

Figure 3:
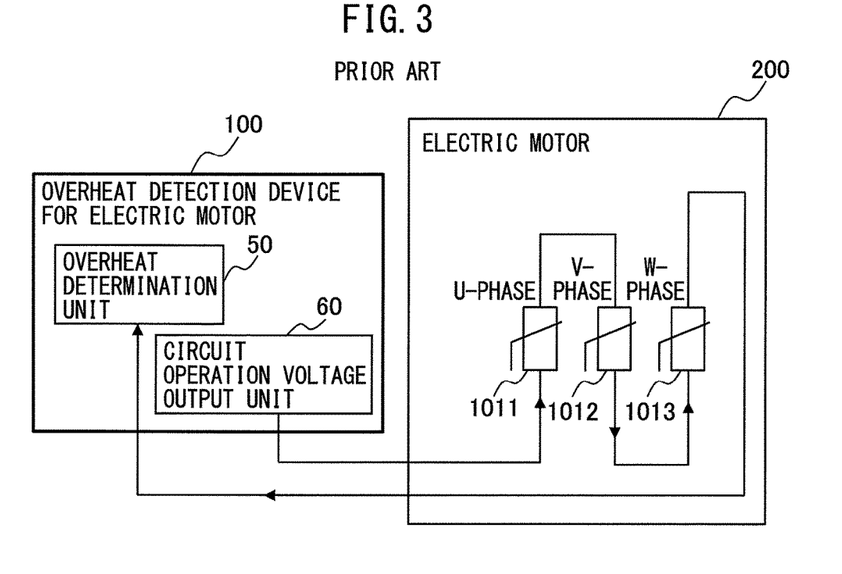
FIG. 3 is a diagram showing a system configuration example of overheat detection for a conventional electric motor.

FIG. 3 shows a system configuration example of overheat detection for a conventional electric motor. When some coil is overheated, the resistance of PTC thermistors 1011 to 1013 sharply increases and voltage drop increases, hence the output voltage from the PTC thermistors increases. Accordingly, when the sum of the output voltage from the serially connected PTC thermistors 1011 to 1013 exceeds a prescribed voltage level that has been determined previously, overheat of, at least, one of the three coils is detected by an overheat determination unit 50, and the control unit of the electric motor 200 issues an overheat alarm.

There has also been another method of realizing similar overheat detection by connecting PTC thermistors in parallel instead of series to form a parallel circuit (for example, Japanese Patent Application Laid-open 2002-315383 (JP 2002-315383 A)). According to this method, substantially equivalent effect can be expected. However, if there exists some disconnection of wires in the parallel circuit, the PTC thermistor located in the disconnected part will not produce any output voltage.

Nevertheless, since the overheat detecting device receives output voltages from the PTC thermistors without a break, the overheat detecting device cannot detect presence/absence of disconnection. As a result, there occurs the risk that an overheat alarm cannot be issued despite the electric motor overheating, hence the overheat detection using a parallel circuit cannot be said to be a perfect measure.

When the electric motor continuously stops at a predetermined position under magnetic excitation, the maximum or almost maximum current flows through the coil of a particular phase, possibly overheating the coil of that phase. In this case, currents out of phase by predetermined angles flow through the coils of the other phases, hence the currents flowing therethrough are not so high as that through the coil of the phase in question, so that these coils will not reach an overheated state. Accordingly, if presence/absence of overheat in the electric motor is determined based on the total voltage across the multiple serially connected PTC thermistors, there occurs following problem. That is, when, despite an electric motor reaching an overheated state at a particular site, the sum of the output voltages of the multiple PTC thermistors has not reached the level over which an overheat alarm is issued, there occurs the problem that no overheat alarm can be output at the moment when a particular site alone is overheated.

Therefore, it is an object of the present invention to provide an overheat detecting device for an electric motor having an overheat determination function that can issue a quick overheat alarm even when a coil of a particular phase of the electric motor alone is overheated.

SUMMARY OF THE INVENTION

The overheat detection device for an electric motor according to one embodiment of the present invention includes: PTC thermistors each attached to the coil of a different phase of a three-phase alternating current (AC) electric motor and connected in series; an overheat determination unit for determining overheat of coils base on the output voltage from the serially connected circuit of the PTC thermistors; and, an output voltage control unit that controls the output voltage from the PTC thermistors in accordance with the electric angle or magnetic phase of the three-phase AC electric motor.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Referring now to the drawings, overheat detection devices for an electric motor according to the present invention will be described. However, it should be noted that the technical scope of the present invention is not limited by the embodied mode of these but embraces the inventions defined by the claims and equivalence.

First Embodiment

Figure 4:
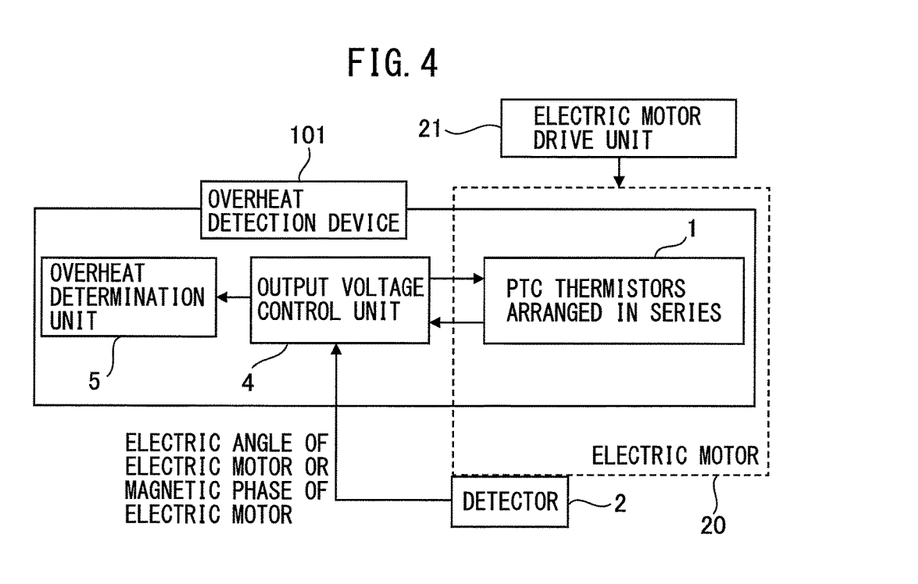
FIG. 4 is a diagram showing a system configuration example of overheat detection for an electric motor according to a first embodiment of the present invention.

An electric motor overheat detection device according to a first embodiment of the present invention will be described with reference to the drawings. FIG. 4 shows a system configuration example of overheat detection for an electric motor according to the first embodiment of the present invention. The overheat detection device 101 for the electric motor according to the first embodiment of the invention comprises: PTC thermistors 1 each attached to the coil of a different phase of a three-phase AC electric motor 20 and connected in series; an overheat determination unit 5 configured to determine overheat of coils based on the output voltage from the circuit of the serially connected PTC thermistors; and an output voltage control unit 4 configured to control the output voltage from the PTC thermistors 1 in accordance with the electric angle or the magnetic phase of the three-phase AC electric motor 20.

The three-phase AC electric motor 20 (which, hereinbelow, will be also referred to simply as "electric motor") includes U-phase, V-phase and W-phase coils (not shown), on the surface of which the U-phase PTC thermistor, the V-phase PTC thermistor and the W-phase PTC thermistor are arranged, respectively. The three PTC thermistors are connected in series by wire as shown in FIG. 3, forming PTC thermistors 1. Electric motor 20 is driven by an electric motor drive unit 21.

The serially connected PTC thermistors 1 are connected in series with a voltage dividing resistor (not shown), forming a closed circuit to which a predetermined voltage $V_0$ is applied by the output voltage control unit 4. The PTC thermistor used in this embodiment presents a low resistance $R_L$ at a normal temperature and a high resistance $R_H$ at a high temperature. The resistance $R_0$ of the voltage dividing resistor preferably has a resistance between these two resistance values.

A detector 2 is placed near the electric motor 20 so as to be able to detect the electric angle of the electric motor 20 or the magnetic phase of the electric motor 20. A resolver may be used as the detector 2. It should be noted that, not limited to resolvers, optical encoders and magnetic encoders may be used by way of example.

The output voltage control unit 4 detects the total output voltage $V_{Total}$ applied to the serially connected PTC thermistors 1. When U-phase, V-phase and W-phase coils all operate normally without overheating, all the three PTC thermistors present low resistance $R_{LU}$, $R_{LV}$ and $R_{LW}$, so that the resistance $(R_{LU}+R_{LV}+R_{LW})$ of the serially arranged thermistors 1 is low enough compared to the resistance $R_D$ of the voltage dividing resistor $(R_{LU}+R_{LV}+R_{LW}<<R_D)$. Accordingly, the total output voltage $V_{Total}$ applied across the serially arranged PTC thermistors 1, detected by the output voltage control unit 4 is sufficiently lower than the voltage $V_0$ applied by the output voltage control unit 4 $(V_{Total}<<V_0)$.

On the other hand, when, at least, one of the U-phase, V-phase and W-phase coils is overheating, the PTC thermistor put on the overheated coil presents a high resistance $R_H$. For example, when one coil alone is overheated, one PTC thermistor alone presents high resistance $R_H$. Since $R_H>>R_L$, the resistance of the serially arranged thermistors 1 is approximately equal to $R_H$. Further, since this $R_H$ is sufficiently higher than the resistant $R_D$ of the voltage dividing resistor ($R_H \gg R_D$), the total output voltage $V_{Total}$ applied across the serially arranged PTC thermistors 1, detected by the output voltage control unit 4 is equal to or nearly equal to the voltage $V_0$ applied by the output voltage control unit 4. Accordingly, it is possible to detect whether at least one coil has been overheated, by detecting the total output voltage $V_{Total}$ applied across the serially arranged PTC thermistors 1. In the present invention, as will be described later, it is possible to identify which coil among the U-phase, V-phase and W-phase coils is in an overheated state, from the total output voltage $V_{Total}$ applied across the serially arranged PTC thermistors 1. Further, when the total output voltage $V_{Total}$ applied to the serially arranged PTC thermistors 1 is 0[V], it is possible to detect that at least one of the three PTC thermistors is broken or disconnected.

As described above, the overheat determination unit 5 can determine overheat of the coils based on the output voltage from the serially connected circuit of PTC thermistors.

Second Embodiment

Figure 5:
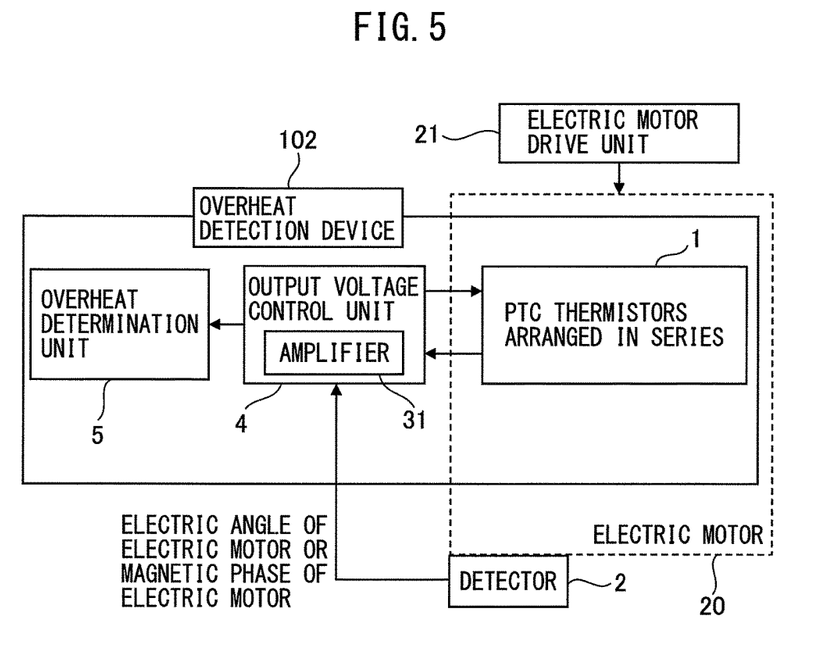
FIG. 5 is a diagram showing a system configuration example of overheat detection for an electric motor according to a second embodiment of the present invention.

Next, an overheat detection device for an electric motor according to a second embodiment of the present invention will be described. FIG. 5 shows a system configuration example of overheat detection for an electric motor according to the second embodiment of the present invention. The difference of the overheat detection device 102 for an electric motor according to the second embodiment of the invention from the overheat detection device 101 for an electric motor according to the first embodiment is in that the output voltage control unit 4 amplifies the output voltage from the PTC thermistor in accordance with the electric angle or magnetic phase of the three-phase AC electric motor 20. FIG. 5 shows an example where a PTC thermistor output voltage amplifier (which will be referred to hereinbelow simply as "amplifier") 31 is provided inside the output voltage control unit 4. However, not limited to this, the amplifier may be provided separately. Since other configurations of the electric motor overheat detection device 102 according to the second embodiment are the same as those of the electric motor overheat detection device 101 according to the first embodiment, detailed description is omitted.

The amplifier 31 amplifies an overheat alarm issuance level $V_{OH}$ by a multiple of a constant $\alpha$ ($\alpha \geq 1$) depending on the electric angle or the magnetic phase of the three-phase AC electric motor detected by the detector 2.

Figure 6:
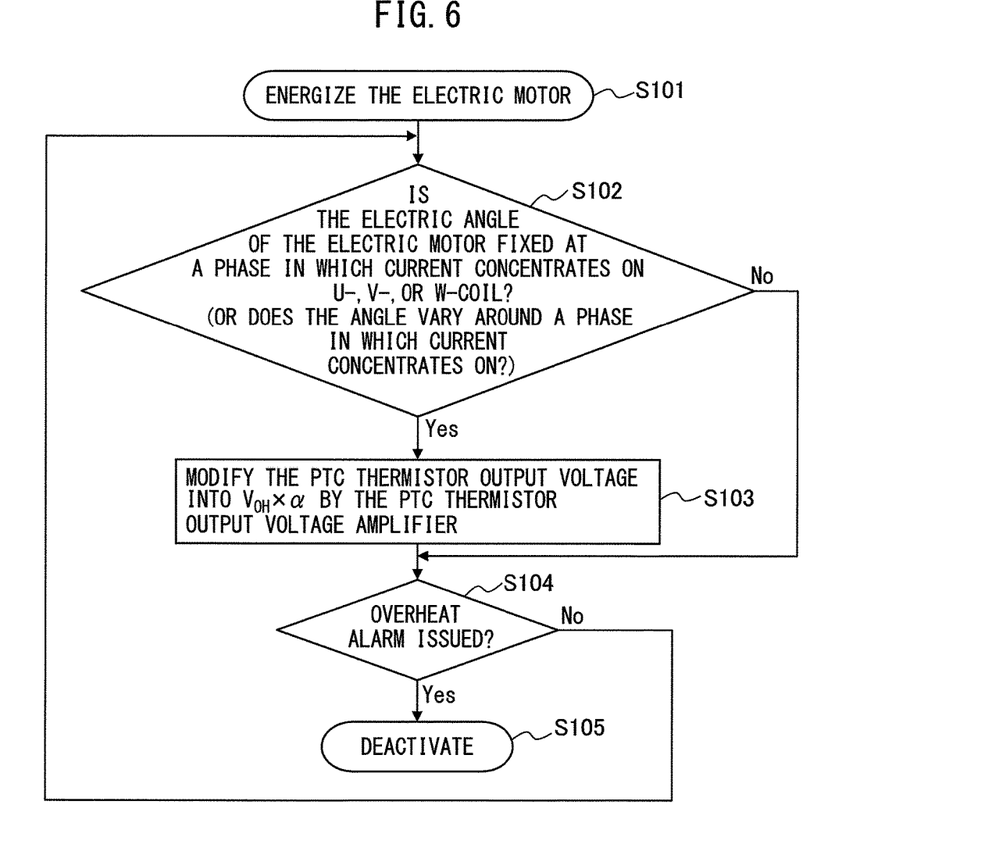
FIG. 6 is a flow chart of overheat detection of an overheat detection device according to the second embodiment of the present invention.

Next, the operation sequence of the overheat detection device for an electric motor according to the second embodiment of the invention will be described. FIG. 6 is a flow chart of overheat detection of the overheat detection device according to the second embodiment of the present invention. First, the electric motor is energized at Step S101.

Next, at Step S102, it is determined whether the electric angle of the electric motor is fixed at a phase in which current concentrates on any one of U-phase, V-phase and W-phase coils. For example, if the electric angle of the electric motor is fixed at a phase in which current concentrates on the U-phase coil, it can be determined that the U-phase coil is overheating. When the electric angle of the electric motor is fixed at a phase in which current concentrates on the U-phase, V-phase or W-phase coil, the PTC thermistor output voltage is modified by amplifying $V_{OH}$ by $\alpha$ times by means of the PTC thermistor output voltage amplifier 31. Here, $\alpha$ is a constant equal to or greater than 1, which enables even the PTC thermistor output voltage for substantially one phase to exceed the voltage level for overheat alarm issuance and issue an overheat alarm without fail.

Thereafter, at Step S104, it is determined whether an overheat alarm is being issued. If no overheat alarm is being issued, the sequence returns to Step S102 and continues detection of presence/absence of overheat of the coils. On the other hand, when an overheat alarm is being issued, the electric motor is deactivated at Step S105.

As described above, according to the overheat detection device for the electric motor according to the second embodiment, it is possible to quickly detect presence/absence of overheat of the coils by setting the PTC thermistor output voltage at a suitable value depending on the presence/absence of concentration of current.

Third Embodiment

Figure 7:
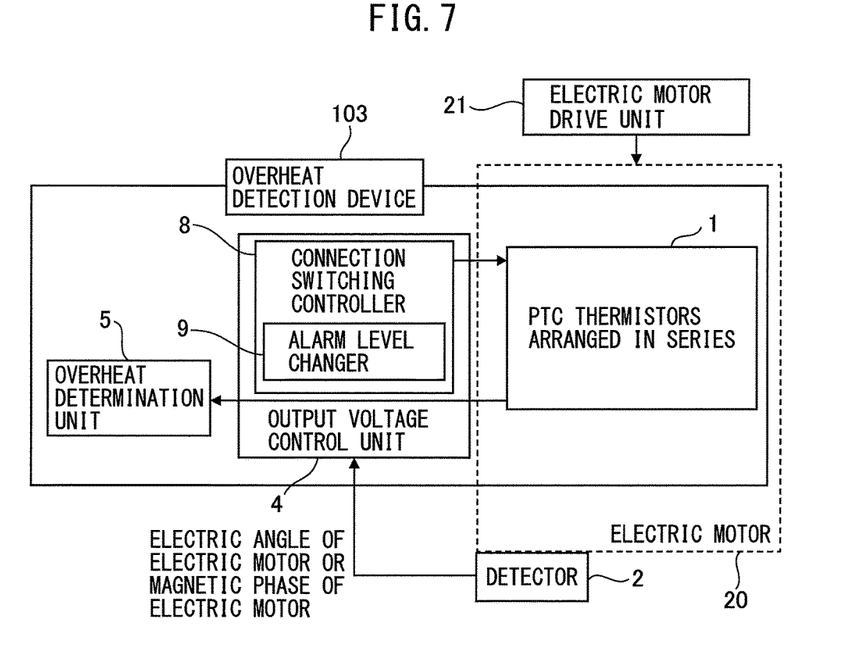
FIG. 7 is a diagram showing a system configuration example of overheat detection for an electric motor according to a third embodiment of the present invention.
Figure 8:
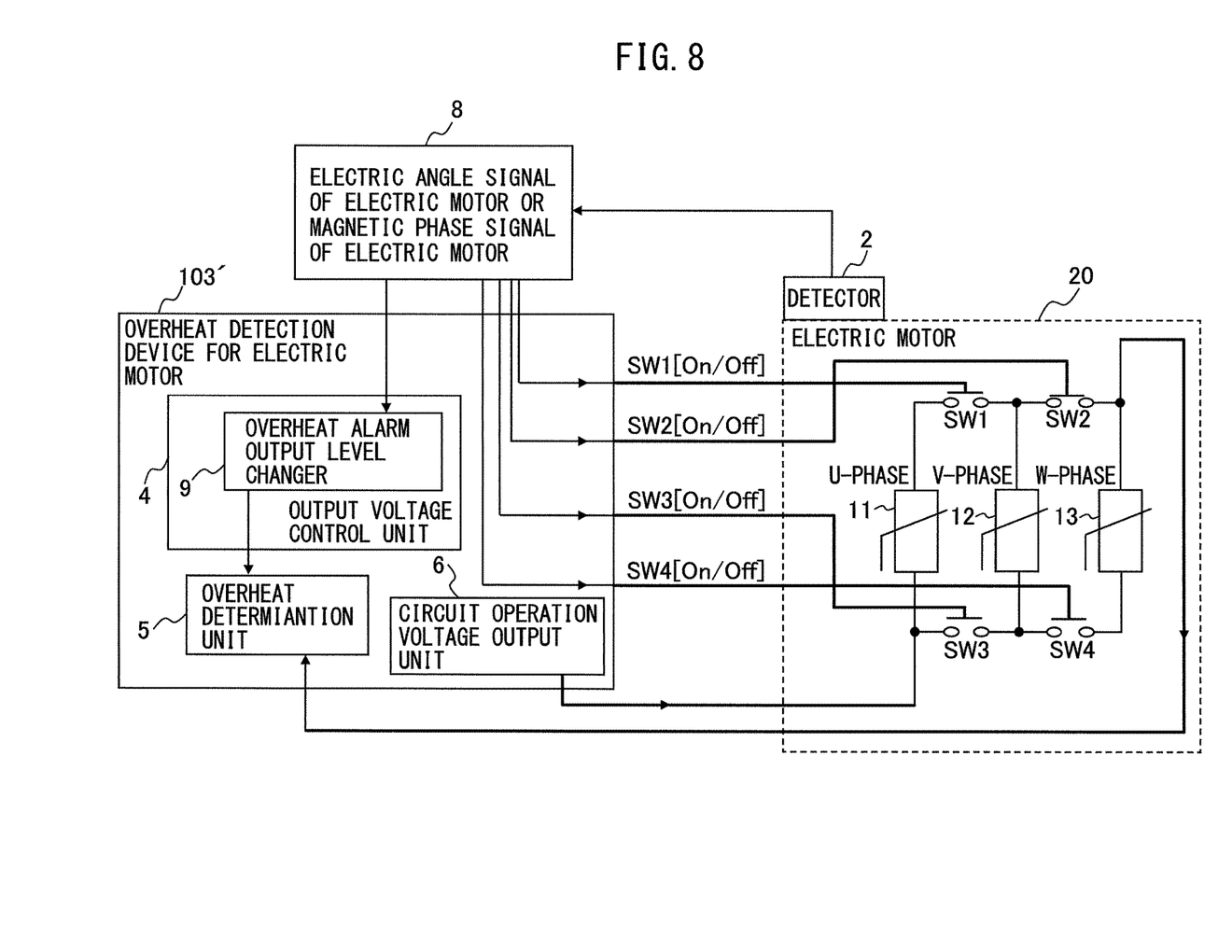
FIG. 8 is a diagram showing a system configuration example of overheat detection for an electric motor according to the other example of the third embodiment of the present invention.

Next, an overheat detection device for an electric motor according to a third embodiment of the present invention will be described. FIGS. 7 and 8 show a system configuration example of overheat detection for an electric motor according to the third embodiment of the present invention. The difference of the overheat detection device 103 for an electric motor according to the third embodiment of the present invention from the overheat detection device 101 for an electric motor according to the first embodiment is in that the output voltage control unit 4 includes a connection switching controller 8 for switching connections of the PTC thermistors provided for the three-phase AC electric motor in accordance with the electric angle or magnetic phase of the three-phase AC electric motor 20 and an overheat alarm level changer 9 for switching the overheat alarm level of the overheat determination unit 5. Since other configurations of the overheat detection device 103 for an electric motor according to the third embodiment are the same as those of the overheat detection device 101 for an electric motor according to the first embodiment, detailed description is omitted. Here, FIG. 8 shows a variational example of the overheat detection system for the electric motor according to the third embodiment, in which a connection switching controller 8 is provided outside the overheat detection device 103' for an electric motor.

Since the PTC thermistors shown in the first embodiment are connected in series, it is impossible to directly measure the individual output voltage from each PTC thermistor. To deal with this, in the overheat detection device according to the third embodiment, in order to obtain the individual output voltage of a particular PTC thermistor alone among the three PTC thermistors, a plurality of switches SW1 to SW4 are provided. As shown in FIG. 8, the SW1 is arranged between one terminal of the U-phase thermistor 11 and one terminal of the V-phase thermistor 12. The SW2 is arranged between one terminal of the V-phase thermistor 12 and one terminal of the W-phase thermistor 13. The SW3 is arranged between the other terminal of the U-phase thermistor 11 and the other terminal of the V-phase thermistor 12. The SW4 is arranged between the other terminal of the V-phase thermistor 12 and the other terminal of the W-phase thermistor 13.

The connection switching controller 8 outputs commands for switching multiple switches SW1 to SW4 so as to obtain the individual output from a particular PTC alone, in accordance with the electric angle or magnetic phase of the three-phase AC electric motor 20, detected by the detector 2.

The overheat alarm issuance level changer (which may be also referred to simply as "alarm level changer") 9, following the commands from connection switching controller 8, changes the overheat alarm issuance level, in accordance with the detected electric angle or magnetic phase of the three-phase AC electric motor 20.

Figure 9:
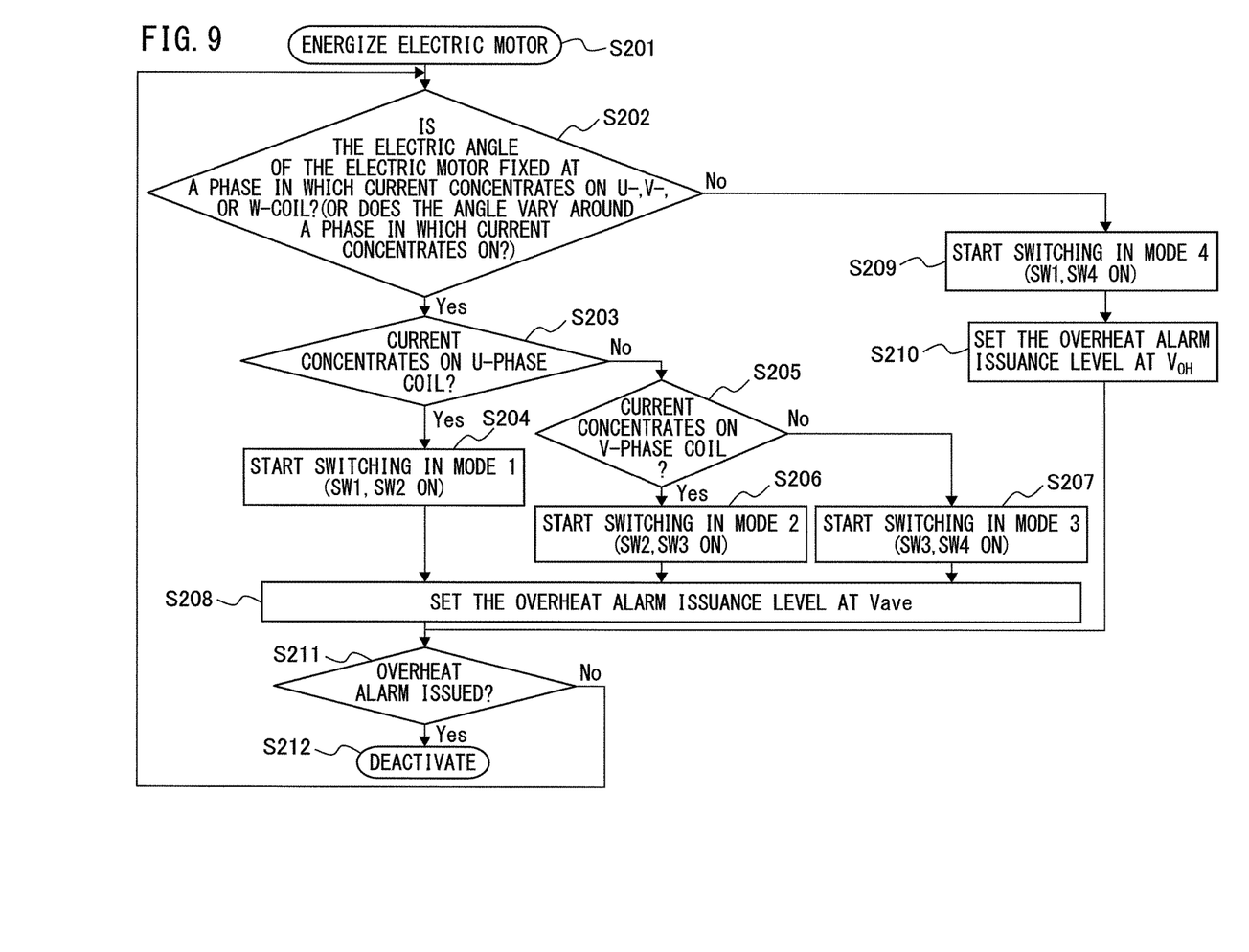
FIG. 9 is a flow chart of overheat detection of an overheat detection device according to the third embodiment of the present invention.

Next, the operation sequence of the overheat detection device for the electric motor according to the third embodiment will be described using a flow chart shown in FIG. 9. First, the electric motor is energized at Step S201. Next, at Step S202 it is determined whether the electric angle of the electric motor 20 is fixed at a phase in which current concentrates on any one of U-phase, V-phase and W-phase coils, in accordance with the electric angle or magnetic phase detected by the detector 2. When the electric angle of the electric motor 20 is fixed at a phase in which current concentrates on one of U-phase, V-phase and W-phase coils, it is determined if the current concentration is occurring in the U-phase coil, at Step S203.

Figure 12A:
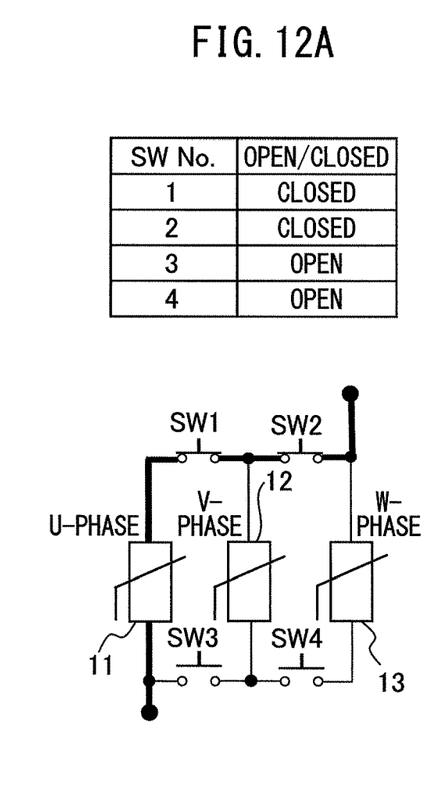
FIG. 12A is a diagram showing a circuit configuration in overheat detection devices according to the third and fourth embodiments of the present invention when electric current flows intensively through the U-phase coil with the electric angle of the electric motor fixed, in a PTC thermistor circuit having switching elements.

If it has been determined that current concentration is occurring in the U-phase coil, switching in mode 1 is started at Step S204. In mode 1, SW1 and SW2 are "closed" while SW3 and SW4 are "open", as shown in FIG. 12A. With this setting, it is possible to detect the output voltage from the U-phase PTC thermistor 11 alone.

Figure 12B:
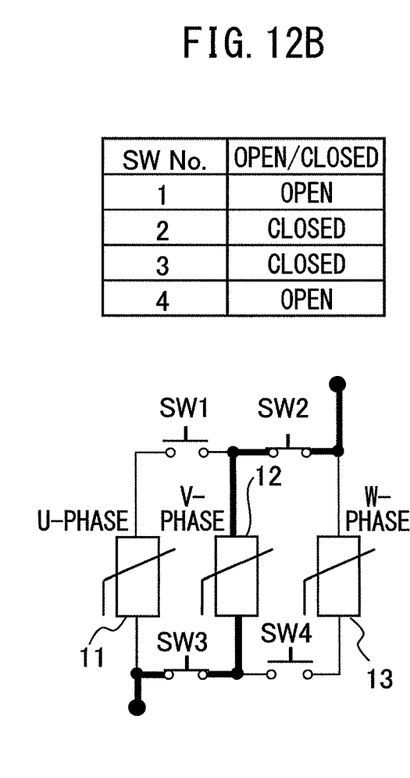
FIG. 12B is a diagram showing a circuit configuration in overheat detection devices according to the third and fourth embodiments of the present invention when electric current flows intensively through the V-phase coil with the electric angle of the electric motor fixed, in a PTC thermistor circuit having switching elements.

On the other hand, when no current concentration is occurring in the U-phase coil at Step S203, it is determined if the current concentration is occurring in the V-phase coil at Step S205. When current concentration is occurring in the V-phase coil, switching in mode 2 is started at Step S206. In mode 2, SW2 and SW3 are "closed" while SW1 and SW4 are "open", as shown in FIG. 12B. With this setting, it is possible to detect the output voltage from the V-phase PTC thermistor 12 alone.

Figure 12C:
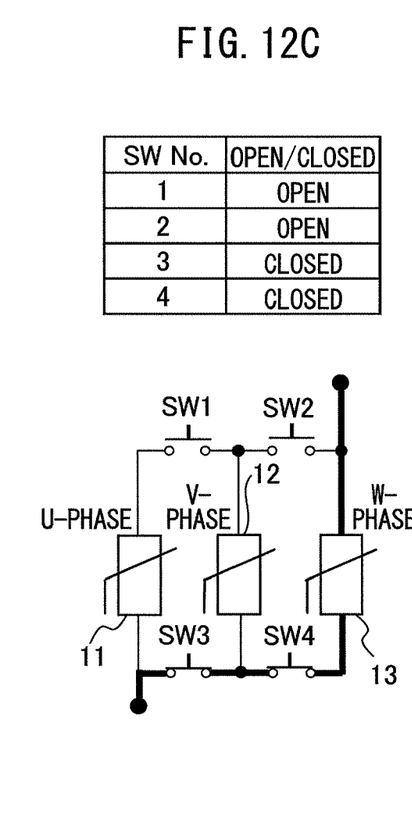
FIG. 12C is a diagram showing a circuit configuration in overheat detection devices according to the third and fourth embodiments of the present invention when electric current flows intensively through the W-phase coil with the electric angle of the electric motor fixed, in a PTC thermistor circuit having switching elements; and, FIG. 13 is a diagram showing a circuit configuration in overheat detection devices according to the second and fourth embodiments of the present invention when the electric angle of the electric motor is in a state other than the above, in a PTC thermistor circuit having switching elements.

On the other hand, when current concentration is not occurring in the V-phase coil at Step S205, current concentration should be occurring in the W-phase coil, so that switching in mode 3 is started at Step S207. In mode 3, SW3 and SW4 are "closed" while SW1 and SW2 are "open", as shown in FIG. 12C. With this setting, it is possible to detect the output voltage from the W-phase PTC thermistor 13 alone.

Next, at Step S208, the overheat alarm issuance level is set at Vave, and it is determined whether an overheat alarm is occurring at Step S211. When it is determined that an overheat alarm is being issued, the electric motor is deactivated at Step S212. When it is determined that no overheat alarm is being issued, the control is returned to Step S202 to continue detection of presence of overheat.

Figure 13:
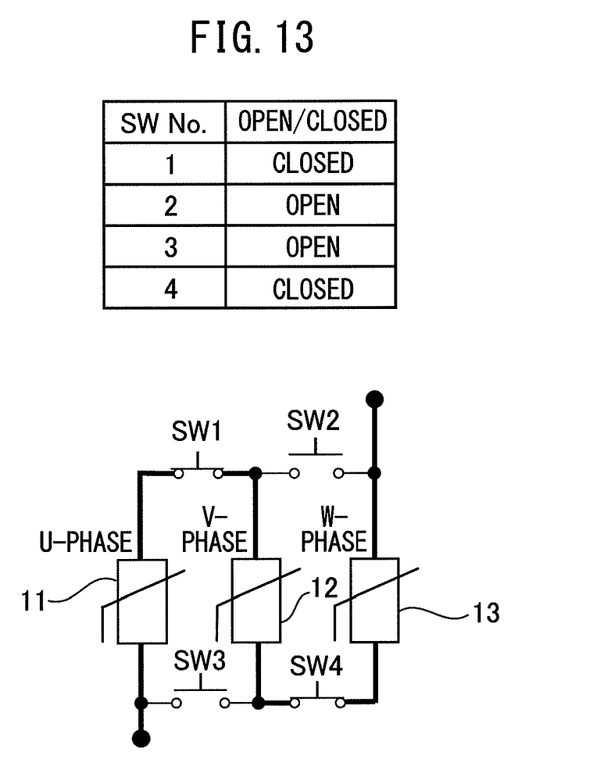

On the other hand, when, at Step S202, it is determined that the electric angle of the electric motor 20 is not fixed at a phase in which current concentrates on U-phase, V-phase or W-phase coils, switching in mode 4 is started at Step S209. In mode 4, SW1 and SW4 are "closed" while SW2 and SW3 are "open" as shown in FIG. 13. With this setting, PTC thermistors 11 to 13 for U-phase, V-phase and W-phase are connected in series, so that the total output voltage from three PTC thermistors 11 to 13 can be detected. Then, at Step S210 the overheat alarm issuance level is set at $V_{OH}$, and it is determined whether an overheat alarm is occurring at Step S211. When it is determined that an overheat alarm is occurring, the electric motor is deactivated at Step S212. When it is determined that no overheat alarm is being issued, the sequence is returned to Step S202 to continue detection of presence/absence of overheat.

In the above way, it is possible for a voltage detector 3 to directly direct each of output voltage $V_u$, $V_V$ and $V_W$ from U-phase, V-phase and W-phase PTC thermistors 11 to 13, based on the phase among U-phase, V-phase and W-phase, in which current concentration is taking place. Further, since the overheat alarm issuance level is set at Vave at the time of measurement of each output voltage, it is possible to appropriately detect presence/absence of overheat in coils.

On the other hand, when no current concentration has occurred in any of the coils, it is possible to constantly monitor the U-phase, V-phase and W-phase coils by connecting the three PTC thermistors for U-phase, V-phase and W-phase in series. Accordingly, it is possible to quickly detect overheating when any of the three thermistors is overheated. Further, since the overheat alarm issuance level is set at $V_{OH}$ to measure the total output voltage of the three thermistors, it is possible to appropriately detect presence/absence of overheat in coils.

Fourth Embodiment

Figure 10:
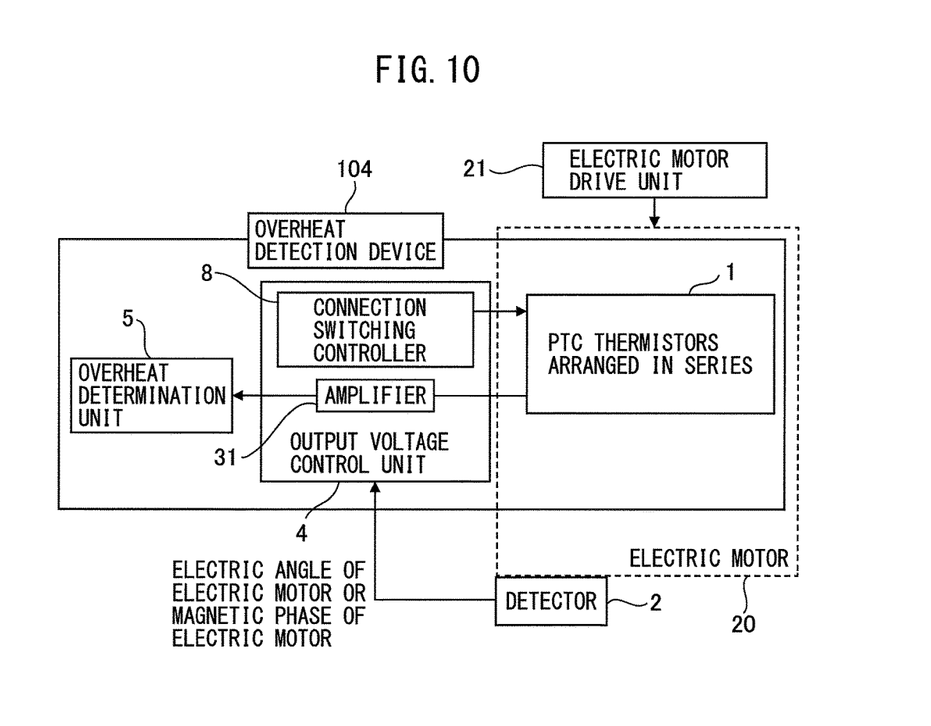
FIG. 10 is a diagram showing a system configuration example of overheat detection for an electric motor according to a fourth embodiment of the present invention.
Figure 11:
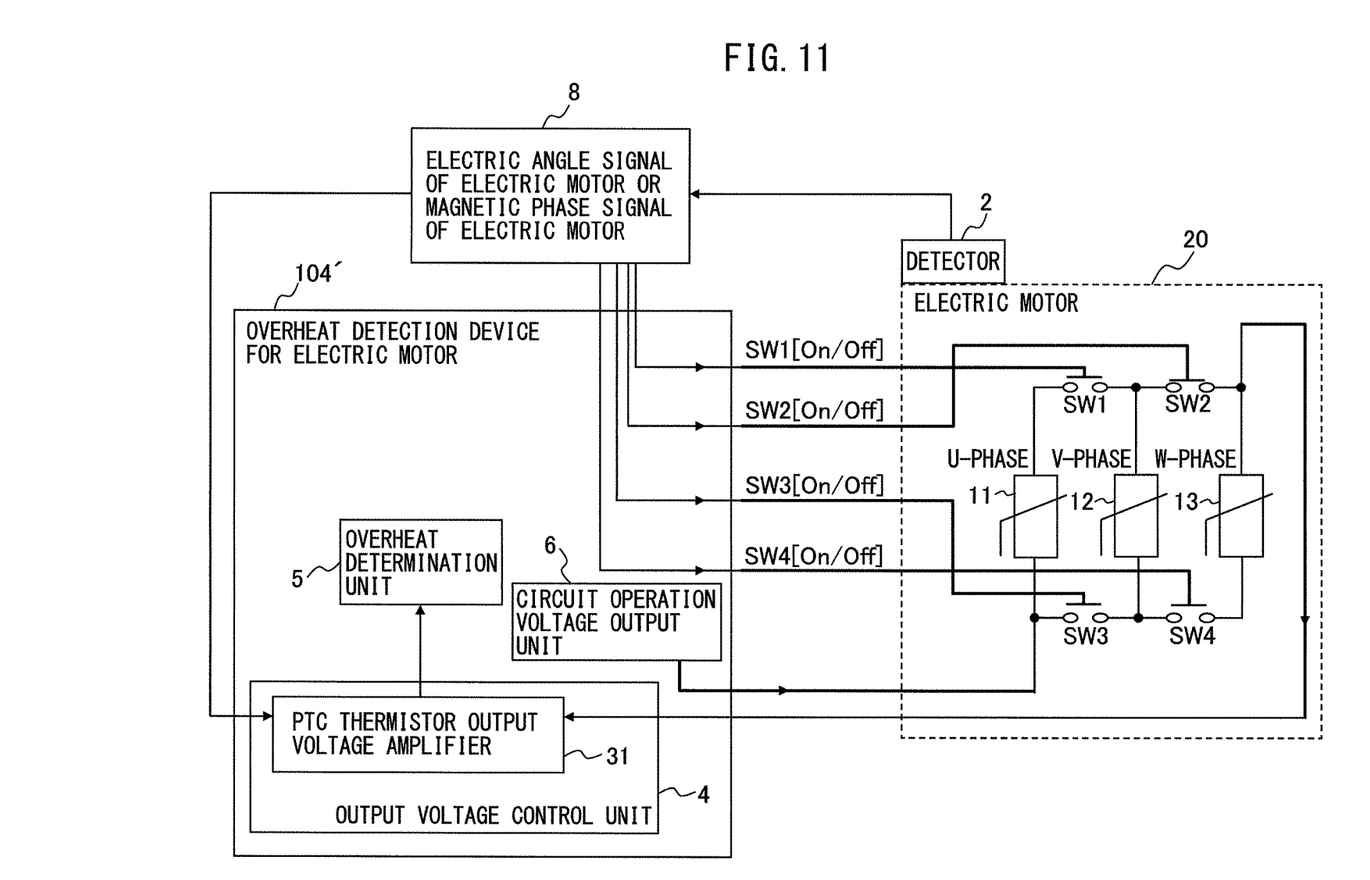
FIG. 11 is a diagram showing a system configuration example of overheat detection for an electric motor according to the other example of the fourth embodiment of the present invention.

An overheat detection device for an electric motor according to a fourth embodiment of the present invention will be described. FIGS. 10 and 11 show a system configuration example of overheat detection for an electric motor according to the fourth embodiment of the present invention. The difference of the electric motor overheat detection device 104 according to the fourth embodiment from the electric motor overheat detection device 102 according to the second embodiment is in that the output voltage control unit 4 includes a connection switching controller 8 for switching connections of the PTC thermistors 11 to 13 provided for the three-phase AC electric motor in accordance with the electric angle or magnetic phase of the three-phase AC electric motor 20. Since other configurations of the electric motor overheat detection device 104 according to the fourth embodiment are the same as those of the electric motor overheat detection device 102 according to the second embodiment, detailed description is omitted. FIG. 11 shows a variational example of an overheat detection system for an electric motor according to the fourth embodiment, in which a connection switching controller 8 is provided outside the electric motor overheat detection device 104'.

Since the PTC thermistors shown in the second embodiment are connected in series, it is impossible to directly measure the individual output voltage from each PTC thermistor. To deal with this, in the overheat detection device according to the fourth embodiment, in order to obtain the individual output voltage of a particular PTC thermistor alone among the three PTC thermistors, a plurality of switches SW1 to SW4 are provided. As shown in FIG. 11, the SW1 is arranged between one terminal of the U-phase thermistor 11 and one terminal of the V-phase thermistor 12. The SW2 is arranged between one terminal of the V-phase thermistor 12 and one terminal of the W-phase thermistor 13. The SW3 is arranged between the other terminal of the U-phase thermistor 11 and the other terminal of the V-phase thermistor 12. The SW4 is arranged between the other terminal of the V-phase thermistor 12 and the other terminal of the W-phase thermistor 13.

The connection switching controller 8 outputs commands for switching multiple switches SW1 to SW4 so as to obtain the individual output from a particular PTC alone, in accordance with the electric angle or magnetic phase of the three-phase AC electric motor 20, detected by the detector 2.

According to the overheat detection device for an electric motor according to the fourth embodiment, similarly to the third embodiment, it is possible to directly detect each of output voltages from the U-phase, V-phase and W-phase thermistors, by appropriately opening/closing switches SW1 to SW4. Accordingly, it is possible to exactly and quickly detect presence/absence of overheating of coils.

Since a series circuit is used in the present invention, by providing a disconnection detecting mode separately from overheat detecting mode and applying a circuit operation voltage to the series circuit that flows current through all the PTC thermistors at the time of activation of the electric motor or periodically during operation, it is possible to detect presence/absence of disconnection in the overheat detection device because a voltage of zero is returned when a disconnection is taking place.

As has been described heretofore, according to the overheat detection device for an electric motor according to the embodiment of the present invention, it is possible to quickly perform thermal protection for electric motors in any energized condition. Accordingly, it is possible to realize highly reliable protection against burnout of the motor. Further, since all the PTC thermistors built in the electric motor are essentially connected in series in each detection mode, it is possible to perform thermal protection of the electric motor by use of a necessary minimum number of PTC thermistor signal input/output terminals.

What is claimed is:

1. An overheat detection device for an electric motor comprising:
    PTC thermistors each attached to a U-phase, V-phase and W-phase coil of a three-phase AC electric motor, the PTC thermistors being connected in series,
    each PTC thermistor providing an output voltage corresponding to the temperature of its respective coil;
    a detector for measuring an electric angle or magnetic phase of the three phase AC electric motor;
    an output voltage control unit configured to
        receive the measured electric angle or magnetic phase,
        determine whether the measured electric angle or magnetic phase corresponds to current concentrating on one of the U-phase, V-phase or W-phase coils, and
        amplify the output voltage from the PTC thermistor of one of the U-phase, V-phase or W-phase coil in which current concentrates
    an overheat determination unit configured to:
        compare the output voltage of the PTC thermistor amplified by the output voltage control unit to a predetermined voltage, and
        determine that overheat occurs when the amplified output voltage of the PTC thermistor exceeds the predetermined voltage.

2. The overheat detection device for an electric motor according to claim 1, wherein the output voltage control unit includes:
    a connection switching controller configured to switch connections of the PTC thermistors provided for the three-phase AC electric motor in accordance with the electric angle or magnetic phase of the three-phase AC electric motor; and
    an overheat alarm level changer configured to change the overheat alarm level of the overheat determination unit.

3. The overheat detection device for an electric motor according to claim 1, wherein the output voltage control unit includes a connection switching controller configured to switch connections of the PTC thermistors provided for the three-phase AC electric motor in accordance with the electric angle or magnetic phase of the three-phase AC electric motor.

* * * * *